United States Patent
Oldenburg

(10) Patent No.: US 7,658,386 B2
(45) Date of Patent: Feb. 9, 2010

(54) RETROFITTABLE SEVERE DUTY SEAL FOR A SHAFT

(75) Inventor: Michael R. Oldenburg, Madelia, MN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 527 days.

(21) Appl. No.: 11/230,265

(22) Filed: Sep. 19, 2005

(65) Prior Publication Data

US 2006/0012129 A1    Jan. 19, 2006

Related U.S. Application Data

(60) Division of application No. 09/855,001, filed on May 14, 2001, now abandoned, which is a continuation-in-part of application No. 09/690,524, filed on Oct. 17, 2000, now Pat. No. 6,406,026, which is a continuation of application No. 08/937,427, filed on Sep. 25, 1997, now Pat. No. 6,186,507, said application No. 09/855,001 and a continuation-in-part of application No. 09/618,619, filed on Jul. 18, 2000, now Pat. No. 6,464,228, is a continuation-in-part of application No. 08/937,427, filed on Sep. 25, 1997, now Pat. No. 6,186,507.

(51) Int. Cl.
*F16J 15/32* (2006.01)
*F16J 15/34* (2006.01)

(52) U.S. Cl. .................. 277/353; 277/551; 277/572

(58) Field of Classification Search ................ 277/353, 277/549, 551, 572–577
See application file for complete search history.

(56) References Cited

U.S. PATENT DOCUMENTS

| | | | |
|---|---|---|---|
| 3,022,081 A | 2/1962 | Kosatka | |
| 3,086,781 A | 4/1963 | Hudson et al. | |
| 3,114,558 A | 12/1963 | Rhoads et al. | |
| 3,135,518 A | 6/1964 | Carson et al. | |
| 3,356,376 A | 12/1967 | Bradfute et al. | |
| 3,606,351 A | 9/1971 | Hallerback | |
| 3,843,139 A | 10/1974 | Messenger | |
| 3,847,453 A | 11/1974 | Herbert | |
| 4,156,531 A | 5/1979 | Boucquey | |
| 4,277,072 A | 7/1981 | Forch | 277/404 |
| 4,285,526 A | 8/1981 | Klinteberg et al. | |
| 4,418,919 A | 12/1983 | Wentworth | |
| 4,432,557 A * | 2/1984 | Drucktenhengst | 277/351 |

(Continued)

FOREIGN PATENT DOCUMENTS

EP    0 036 281 B1    7/1983

(Continued)

*Primary Examiner*—Vishal Patel
(74) *Attorney, Agent, or Firm*—Ronald W. Wangerow; Harness, Dickey & Pierce, P.L.C.

(57) ABSTRACT

The present invention discloses a seal and a method of sealing dynamic shaft applications. The seal comprises an inner portion, an outer portion, a faceplate, and at least one flexible member located between the inner and outer portions. The method comprises providing a dynamic shaft assembly containing a bore for receiving a seal, providing a unitized seal, and placing the unitized seal on the shaft, thus sealing the assembly so that lubricants may not escape, and foreign material may not enter. The unitized seal can provide permanently lubricated sealed bearings in severe service conditions such as rollers and idlers of track-driven vehicles and agricultural equipment.

28 Claims, 10 Drawing Sheets

U.S. PATENT DOCUMENTS

| | | | |
|---|---|---|---|
| 4,448,426 A | 5/1984 | Jackowski et al. | |
| 4,457,521 A | 7/1984 | Morley | |
| 4,491,332 A | 1/1985 | Zumbusch | |
| 4,497,495 A | 2/1985 | Christiansen | |
| 4,501,431 A | 2/1985 | Peisker et al. | |
| 4,513,976 A | 4/1985 | Bentley et al. | |
| 4,516,783 A | 5/1985 | Mitsue et al. | |
| 4,526,377 A | 7/1985 | Hale et al. | |
| 4,550,920 A | 11/1985 | Matsushima | |
| 4,552,367 A | 11/1985 | Fedorovich et al. | 277/551 |
| 4,613,005 A | 9/1986 | Olsson | |
| 4,667,968 A | 5/1987 | Nash et al. | |
| 4,696,479 A | 9/1987 | Karcher | 277/353 |
| 4,721,312 A * | 1/1988 | Hornberger | 277/349 |
| 4,808,012 A | 2/1989 | Otto | |
| 4,819,999 A | 4/1989 | Livesay et al. | |
| 4,856,794 A | 8/1989 | Boyers et al. | |
| 4,936,433 A | 6/1990 | Kyle | |
| 4,943,068 A | 7/1990 | Hatch et al. | 277/353 |
| 5,004,248 A * | 4/1991 | Messenger et al. | 277/351 |
| 5,015,001 A | 5/1991 | Jay | 277/551 |
| 5,028,054 A | 7/1991 | Peach | 277/348 |
| 5,042,822 A | 8/1991 | Dreschmann et al. | |
| 5,096,207 A * | 3/1992 | Seeh et al. | 277/353 |
| 5,183,269 A | 2/1993 | Black et al. | |
| 5,201,528 A * | 4/1993 | Upper | 277/394 |
| 5,201,529 A | 4/1993 | Heinzen | |
| 5,209,499 A | 5/1993 | Ruff, Jr. et al. | |
| 5,209,502 A | 5/1993 | Savoia | |
| 5,211,406 A | 5/1993 | Katzensteiner | 277/351 |
| 5,269,536 A * | 12/1993 | Matsushima et al. | 277/349 |
| 5,299,811 A | 4/1994 | Kershaw | |
| 5,340,125 A | 8/1994 | Brown et al. | |
| 5,348,312 A | 9/1994 | Johnston | |
| 5,370,404 A * | 12/1994 | Klein et al. | 277/572 |
| 5,380,015 A | 1/1995 | Laflin et al. | |
| 5,470,157 A | 11/1995 | Dougherty et al. | |
| 5,480,161 A | 1/1996 | Borowski | |
| 5,503,408 A | 4/1996 | Hermann et al. | |
| 5,522,600 A | 6/1996 | Duckwall | |
| RE35,309 E | 8/1996 | Matsushima et al. | |
| 5,577,741 A | 11/1996 | Sink | |
| 5,582,412 A | 12/1996 | Sabo Filho | |
| 5,607,168 A | 3/1997 | Dahll | |
| 5,655,781 A * | 8/1997 | Petrak | 277/371 |
| 5,676,383 A | 10/1997 | Chandler | |
| 5,687,972 A | 11/1997 | Petrak | |
| 5,716,277 A | 2/1998 | Reynolds | |
| 5,836,700 A | 11/1998 | Wilkie, Jr. et al. | |
| 5,944,321 A | 8/1999 | Niebling et al. | |
| 5,975,538 A | 11/1999 | Krause et al. | |
| 6,050,572 A | 4/2000 | Balsells et al. | |
| 6,073,933 A | 6/2000 | Johnston | |
| 6,149,158 A | 11/2000 | Tripathy | 277/307 |
| 6,168,165 B1 | 1/2001 | Sabo | |
| 6,170,833 B1 | 1/2001 | Cox et al. | |
| 6,186,507 B1 | 2/2001 | Oldenburg | |
| 6,199,869 B1 | 3/2001 | Furuyama et al. | |
| 6,220,600 B1 | 4/2001 | Tripathy et al. | |
| 6,257,587 B1 | 7/2001 | Toth et al. | 277/309 |
| 6,315,296 B1 * | 11/2001 | Oldenburg | 277/353 |
| 6,357,751 B1 | 3/2002 | Rentschler | |
| 6,406,026 B1 | 6/2002 | Oldenburg | |
| 6,450,503 B1 * | 9/2002 | Dossena et al. | 277/572 |

FOREIGN PATENT DOCUMENTS

| | | |
|---|---|---|
| EP | 0 086 002 A1 | 8/1983 |
| EP | 0 091 983 A1 | 10/1983 |
| EP | 0 128 241 A2 | 12/1984 |
| EP | 0 172 348 A1 | 2/1986 |
| EP | 0 213 652 A1 | 3/1987 |
| EP | 0 230 120 A2 | 7/1987 |
| EP | 0 260 441 A2 | 3/1988 |
| EP | 0 172 881 B1 | 9/1988 |
| EP | 0 281 452 A1 | 9/1988 |
| EP | 0 301 731 A2 | 2/1989 |
| EP | 0 303 359 A1 | 2/1989 |
| EP | 0 304 160 A1 | 2/1989 |
| EP | 0 337 893 A1 | 10/1989 |
| EP | 0 385 635 A2 | 9/1990 |
| EP | 0 394 025 A1 | 10/1990 |
| EP | 0 385 635 A3 | 4/1991 |
| EP | 0 420 212 A2 | 4/1991 |
| EP | 0 427 553 A1 | 5/1991 |
| EP | 0 454 193 A1 | 10/1991 |
| EP | 0 474 950 A1 | 3/1992 |
| EP | 0 253 839 B1 | 4/1992 |
| EP | 0 505 793 A1 | 9/1992 |
| EP | 0 420 212 A3 | 12/1992 |
| EP | 0 525 288 A1 | 2/1993 |
| EP | 0 556 494 A1 | 8/1993 |
| EP | 0 562 160 A1 | 9/1993 |
| EP | 0 571 284 A1 | 11/1993 |
| EP | 0 596 196 A2 | 5/1994 |
| EP | 0 611 904 A1 | 8/1994 |
| EP | 0 516 708 B1 | 12/1994 |
| EP | 0 631 072 A1 | 12/1994 |
| EP | 0 596 196 A3 | 6/1995 |
| EP | 0 736 711 A1 | 10/1996 |
| EP | 0 744 567 A1 | 11/1996 |
| EP | 0 789 152 A2 | 8/1997 |
| EP | 0 798 498 A1 | 10/1997 |
| EP | 0 814 288 A1 | 12/1997 |
| EP | 0 789 152 A3 | 4/1998 |
| EP | 0 843 114 A2 | 5/1998 |
| EP | 0 846 900 A1 | 6/1998 |
| EP | 0 864 770 A1 | 9/1998 |
| EP | 0 913 605 A2 | 5/1999 |
| EP | 0 921 334 A1 | 6/1999 |
| EP | 0 843 114 A3 | 7/1999 |
| EP | 0 940 609 A2 | 9/1999 |
| EP | 0 945 656 A2 | 9/1999 |
| EP | 0 670 976 B1 | 11/1999 |
| EP | 0 913 605 A3 | 5/2000 |
| EP | 0 999 364 A2 | 5/2000 |
| EP | 0 999 388 A1 | 5/2000 |
| EP | 1 016 800 A2 | 7/2000 |
| EP | 0 945 656 A3 | 8/2000 |
| EP | 1 024 318 A2 | 8/2000 |
| EP | 1 050 700 A2 | 11/2000 |
| EP | 1 055 849 A2 | 11/2000 |
| EP | 0 999 364 A3 | 2/2001 |
| EP | 1 016 800 A3 | 2/2001 |
| EP | 1 024 318 A3 | 4/2001 |
| EP | 1 096 184 A2 | 5/2001 |
| EP | 1 106 878 A2 | 6/2001 |
| EP | 1 050 700 A3 | 11/2001 |
| EP | 1 164 319 A2 | 12/2001 |
| EP | 1 182 133 A1 | 2/2002 |
| EP | 1 106 878 A3 | 3/2002 |
| EP | 1 055 849 A3 | 4/2002 |
| EP | 1 201 975 A2 | 5/2002 |
| EP | 1 231 418 A2 | 8/2002 |
| EP | 1 245 874 A2 | 10/2002 |
| JP | 53-099156 | 8/1978 |
| JP | 54-132050 | 10/1979 |
| JP | 54-158556 | 12/1979 |
| JP | 55-082857 | 6/1980 |
| JP | 56-105157 | 8/1981 |
| JP | 56-138566 | 10/1981 |
| JP | 58-068552 | 4/1983 |
| JP | 59-126162 | 7/1984 |
| JP | 59-126164 | 7/1984 |

| | | | | | | |
|---|---|---|---|---|---|---|
| JP | 60-139970 | 7/1985 | | JP | 11-248004 | 9/1999 |
| JP | 60-245874 | 12/1985 | | JP | 11-344128 | 12/1999 |
| JP | 62-037571 | 2/1987 | | JP | 2000-065217 | 3/2000 |
| JP | 62-258266 | 11/1987 | | JP | 2000-193096 | 7/2000 |
| JP | 63-071583 | 3/1988 | | JP | 2000-297757 | 10/2000 |
| JP | 63-239314 | 10/1988 | | JP | 2000-346203 | 12/2000 |
| JP | 2-102974 | 4/1990 | | JP | 2001-050287 | 2/2001 |
| JP | 03-010993 | 1/1991 | | JP | 2001-065703 | 3/2001 |
| JP | 03-020175 | 1/1991 | | JP | 2001-074143 | 3/2001 |
| JP | 03020175 A | 1/1991 | | JP | 2001074143 A | 3/2001 |
| JP | 03-260478 | 11/1991 | | JP | 2001-124214 | 5/2001 |
| JP | 03-265765 | 11/1991 | | JP | 2001-125374 | 5/2001 |
| JP | 03260478 A | 11/1991 | | JP | 2001-183955 | 7/2001 |
| JP | 04-203658 | 7/1992 | | JP | 2001-263500 | 9/2001 |
| JP | 05-223174 | 8/1993 | | JP | 2001263500 A | 9/2001 |
| JP | 06-201054 | 7/1994 | | JP | 2001-317635 | 11/2001 |
| JP | 06-300141 | 10/1994 | | JP | 2001-329984 | 11/2001 |
| JP | 07-042848 | 2/1995 | | JP | 2001317635 A | 11/2001 |
| JP | 07-071612 | 3/1995 | | JP | 2001329984 A | 11/2001 |
| JP | 07-174238 | 7/1995 | | JP | 2001-349442 | 12/2001 |
| JP | 07-291186 | 11/1995 | | JP | 2001-355645 | 12/2001 |
| JP | 07-332377 | 12/1995 | | JP | 2002-048147 | 2/2002 |
| JP | 08338534 A | 12/1995 | | JP | 2002-048246 | 2/2002 |
| JP | 08-004776 | 1/1996 | | JP | 2002-115667 | 4/2002 |
| JP | 08-190268 | 7/1996 | | JP | 2002-115668 | 4/2002 |
| JP | 08-254213 | 10/1996 | | JP | 2002-115762 | 4/2002 |
| JP | 08-296743 | 11/1996 | | JP | 2002-122086 | 4/2002 |
| JP | 08-338534 | 12/1996 | | JP | 2002-122087 | 4/2002 |
| JP | 09-088886 | 3/1997 | | JP | 2002122087 A | 4/2002 |
| JP | 09-268981 | 10/1997 | | JP | 2002-130306 | 5/2002 |
| JP | 10-003212 | 1/1998 | | JP | 2002-139058 | 5/2002 |
| JP | 10-009401 | 1/1998 | | JP | 2002-206549 | 7/2002 |
| JP | 10-169787 | 6/1998 | | JP | 2002-228008 | 8/2002 |
| JP | 10-220590 | 8/1998 | | JP | 2002-228009 A | 8/2002 |
| JP | 10-331984 | 12/1998 | | JP | 2002228009 A | 8/2002 |
| JP | 11-013893 | 1/1999 | | JP | 2002-276816 | 9/2002 |
| JP | 11-173239 | 6/1999 | | JP | 2002276816 A | 9/2002 |
| JP | 11-210684 | 8/1999 | | WO | WO 85/03558 | 8/1985 |
| JP | 11-218095 | 8/1999 | | WO | WO 01/90610 A1 | 11/2001 |
| JP | 11-223198 | 8/1999 | | | | |
| JP | 11223198 A | 8/1999 | | * cited by examiner | | |

RETROFITTABLE SEVERE DUTY SEAL FOR A SHAFT

CROSS-REFERENCE TO RELATED APPLICATIONS

This Application is a Divisional of U.S. patent application Ser. No. 09/855,001, filed May 14, 2001, which is a Continuation-in-Part of U.S. patent application Ser. No. 09/690,524, filed Oct. 17, 2000 (now U.S. Pat. No. 6,406,026, issued Jun. 18, 2002), which is a continuation of U.S. application Ser. No. 08/937,427, filed Sep. 25, 1997 (now U.S. Pat. No. 6,186,507, issued Feb. 13, 2001); and U.S. patent application Ser. No. 09/855,001, filed May 14, 2001 is also a continuation-in-part of U.S. patent application Ser. No. 09/618,619, filed Jul. 18, 2000 (now U.S. Pat. No. 6,466,228, issued Oct. 15, 2002), which is a continuation-in-part of U.S. application Ser. No. 08/937,427, filed Sep. 25, 1997 (now U.S. Pat. No. 6,186,507, issued Feb. 13, 2001), all of the above which are herein incorporated by reference in their entirety.

FIELD OF THE INVENTION

The present disclosure is related to the field of seals for sealing dynamic shafts. The apparatus are particularly related to the field of unitary combination lip and sleeve seals. More specifically, this is an improved seal adapted for use in severe duty applications including construction equipment, agricultural machinery, track driven vehicles, and other applications where oil or grease must be held in contact with dynamic shaft assemblies. This seal and other seals of this type must also operate as excluder seals to keep lubricated surfaces free from corrosives, acids, other chemicals, dirt, mud, dust, abrasives, water and other contaminants. This seal incorporates design features that enhance performance (compared to usual original equipment seals) when installed on shafts that have been slightly damaged by normal wear. This seal can also be used as a roller or idler seal for track driven vehicles.

BACKGROUND OF THE INVENTION

The present seal structure yields a very important benefit that has eluded other persons skilled in the art. It can be retrofitted to existing, worn machinery to enhance the protection of costly lubricated machine components. This seal can replace existing seals, and the performance of this seal exceeds that of all other standard-sized, commercially available, conventional, lip and sleeve type seals. The only commercially available type of seal with performance comparable to this embodiment is the dual cone face seal. It is known by those in the art that dual cone face seals have the disadvantage of overall size that significantly restricts their use. The seal disclosed here overcomes that disadvantage.

Conventional unitized lip and sleeve seals are much thinner than dual cone face seals. Since this seal can be installed as a direct replacement for ordinary seals, it can be specified and used without making any modifications to the design of an existing machine. The shaft, the bore, and the housing in which the seal operates are identical whether the present seal or conventional seals are used. Wherever dual cone face seals are desired, the machine must have been originally designed specifically for their use. Dual cone face seals cannot fit into all of the machine locations because of design constraints.

It is an object of the invention to teach the structure and method of using a retrofittable severe duty seal for a shaft.

It is a further object of this disclosure to show a method useful for sealing bearings in shaft-mounted dynamic rollers used in track-driven vehicles.

Another object is to provide a seal that may be useful in any application where a shaft and shaft bearing or bushing surfaces may be exposed to mud, dust, abrasives, cement, submersion, abrasive liquids or other substances that could damage relative dynamic mechanical components.

Another object hereof is to disclose a seal that lasts longer than previously known conventional seals adapted for severe duty applications.

Another object of the present disclosure is to make essentially all of the important benefits of a dual cone face seal available in a physically smaller assembly.

It is an object to make essentially all of the important benefits of a dual cone face seal available in an assembly having the same physical dimensions as a conventional single lip or double lip seal.

Another object hereof is to provide a method for sealing a shaft and bearing assembly using a seal as an excluder seal, as a grease seal, as an oil seal, and as a seal for other liquids at low and moderate pressures.

Another object of this disclosure is to provide a method for using a seal having a shaft-contacting sleeve that enables the seal to be installed on and to operate reliably with shafts having imperfections such as those ordinarily caused by wear and use.

Another object is to provide a method of sealing a shaft and bearing assembly, using an unitary seal structure that both improves reliability, and makes seal installation easier compared to installation of seals that are composed of two or more separable parts.

These and further objects of the apparatus taught in accordance with this specification, the claims, and the figures are set forth below.

SUMMARY OF THE INVENTION

The availability of a seal having the superior performance characteristics of an embodiment according to the present disclosure in a package the size of ordinary seals gives additional freedom to designers of heavy machinery and severe duty assemblies. Many new design possibilities are made available by this seal because of the unitized style of the seal and the small width requirements as compared to dual cone face seals.

An important benefit of the seal disclosed is that it can create permanently lubricated shaft and bearing assemblies that can withstand severe use. This seal may enable equipment manufacturers to improve the performance of their machinery by reducing maintenance requirements. It is believed that existing vehicles and other machines can be retrofitted advantageously by replacing the original re-greasable seals with this new permanently lubricated seal. The lifetime of the new seal can last substantially longer than current lip seals. It is to be understood, however, that the present seal can be used to seal in either oil or grease and to substantially exclude all environmental contaminants that do not attack the materials from which the seal is manufactured.

The present disclosure shows a retrofittable, radial lip seal for sealing a paired shaft and bore assembly rotatable with respect to one another, the seal having a sleeve that may be disposed coaxially on the shaft, and a casing that may be disposed coaxially around the sleeve. The sleeve and casing have an inner end (oil or grease side) that would normally be in contact with the grease, oil, or other fluid to be contained within a housing, and an outer end (dirt side) opposite. The sleeve has a bore that may have an elastomeric coating. The seal also has seal case adapted for fitting into a bore, such as a bore that is formed through a roller end plate, the wall of a housing, or other securement. One or more circular elastomeric faceplate-contacting excluder lips extend coaxially opposite the oil side from a flange outer face.

The case is formed from a generally cylindrical case body having an outside surface, or outside diameter, that may be disposed within a bore and in contact with the wall of the bore. An elastomeric coating may be affixed to the outside of the case body. By coating the outside of the metal case body with an elastomeric coating or layer, it is possible for the seal to securely fit a bore that has become slightly damaged through use.

A resilient layer may cover the outside of the case to improve sealing in conditions where soft, damaged, or other less than optimal bore conditions exist that would impair reliable sealing with a steel outer case surface. In applications that might expose the sealed materials to corrosion, it is preferred to cover with resilient rubberized material all of the portions of the seal case that are likely to contact the corrosive agents.

The case elastomeric coating is formed with a chamfer to minimize the likelihood that the seal will be damaged during installation. One or more optional radial case relief channels may be formed in the case elastomeric coating. A relief channel may reduce the tendency of the elastomeric coating to form a bulge that could cause the seal to become unseated and move axially after installation. It is also possible to provide radial ribs on the outer surface of the case elastomeric coating for the purpose of providing desired installation properties.

A generally planar circular faceplate has an inside surface, an outside surface, and a central aperture slightly larger than the inside diameter of the sleeve. The plane of the inner faceplate surface is disposed generally perpendicular to the seal sleeve and case. An elastomeric portion, or faceplate wiper ring, can be attached to the faceplate at the central aperture so that the faceplate wiper ring extends between the faceplate and the shaft. The faceplate wiper ring has an internal diameter that allows it to contact the shaft and thereby exclude contaminants from the remainder of the seal and the sealed components. In another embodiment, the elastomeric portion, or faceplate wiper ring, can be attached to the case end of the faceplate to contact the inner diameter of the bore.

The sleeve bore is preferably coated with an elastomeric, or rubberized, coating to make it possible to obtain adequate sealing performance when the shaft condition is substandard due to wear, eccentricity, or other causes. A sleeve radial channel may be formed generally midway between the sleeve inner end and the sleeve outer end. The channel relieves shear tension that may develop during installation. The result is that it is easier to install the sleeve and the potential for damage to the sleeve during installation is reduced.

Chamfers are provided at both the inner end and at the outer end of the sleeve bore to reduce the potential for damage to the seal, the shaft, or the housing during installation. In addition, the inner end of the case outer surface is chamfered to make insertion of the sleeve through the housing easier and less likely to damage the dust lips or other components.

Flange peripheral lip and face lips may be formed in the same molding operation that is used to mold the sleeve bore elastomeric coating. The face lips may be designed with shapes similar to those of the peripheral lip and the three dust lips. However, an alternative design for the face lips is disclosed herein. The undercut face lips are adapted to provide superior performance in severe duty operating conditions. The advantage accrues because the undercut lip inside surface responds with increasing pressure in response to contact with materials that would penetrate the seal. The other lips contact the mating seal surface at distinctly different approach angles and with quite different elastomer shapes and configurations.

A sealing lip may also be employed in the seal. The sealing lip can be biased either against the seal sleeve or seal case. In one embodiment, a garter spring is used to bias the sealing lip. One embodiment does not have a sealing lip. Another embodiment has one sealing lip, and a third embodiment has more than one sealing lip.

An alternative form of the embodiment replacing the main sealing lip is favored for some very dirty applications, such as in agricultural machinery, or in applications where the width of the seal is severely limited due to the assembly configuration. One example in which the alternative embodiment of the seal can be used is in cultivator hub wheels. This type of equipment does not typically have much room for a seal around the bearing, and contains only grease in the assembly. In the alternative embodiment, the main sealing lip and the garter spring are replaced by at least one radial wiper, or excluder lip. In addition, the two sleeve contacting dust lips may also be eliminated in this alternative embodiment. The flat lip design may be less susceptible to catastrophic damage by the infiltration of small amounts of foreign materials than are the usual main seal lip and garter spring sets. It is also possible to produce the design with more lips; for example, a triple or quadruple lip design may be desired in some applications. Eliminating the garter spring and main sealing lip portions allows the seal to have a width of 5 mm inside the bore. This seal replaces typical triple lip seals commonly used in such applications, wherein the sealed portion must constantly be filled with grease to force out the grease, because it has either leaked out, or contains foreign material (e.g., dirt, dust, etc.), because those seals do not effectively keep the materials out. In contrast, the seal of the alternative embodiment does not have to be regreased, and is virtually maintenance free, because it effectively excludes foreign material from entering the sealed area, and does not allow the grease to leak out of the sealed area.

It is preferred to have the inner side of the faceplate smoothly finished to reduce wear on the face lips of the seal. Likewise, the outer surface of the sleeve, the sleeve flange inner face, and other any lip-contacting surfaces may be finished to a condition of low surface roughness to reduce the amount of wear to which the various elastomeric excluder and seal lips are subjected. For this reason, it is generally preferred to make the sleeve, case, and faceplate of metal such as stainless steel, carbon steel, or similar materials. It is to be understood, however, that the sleeve, case, and faceplate may be made from other metals and also from non-metallic materials.

In seals of this nature, the seals are normally described by reference to the cross-sectional configuration. The seal of the present embodiment may readily be manufactured in sizes between 0.5 inches and 26 inches with other sizes available on request. By way of example only and without any limitation on the configuration of embodiments of this disclosure, a representative seal may have an inside (shaft) diameter of {fraction (3⅛)}", an outside (bore) diameter of {fraction (4⅛)}", with an overall width of about 1". The various dimensions do not scale proportionately. For example, the same type of seal may be manufactured for a {fraction (6¼)}" shaft diameter but still have an overall width of 1" and be designed to fit into a {fraction (7¾)}" bore. Seals adapted to various purposes may vary in width from less than ⅛" to over 1" but generally have a width between ¼" and ¾".

It is to be understood, as well, that many different formulations of the elastomeric, or rubberized, elements may function satisfactorily. Viton®, nitrile, carboxylated nitrile, polyacrylate, ACM, fluoroelastomers, and silicone compounds are known to provide useful operational characteristics when adapted for incorporation within the seal presently disclosed. Other materials may also be incorporated to confer chemical resistance, extreme temperature resistance, expanded operating pressure range, wear resistance, or other desired properties to the final seal assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
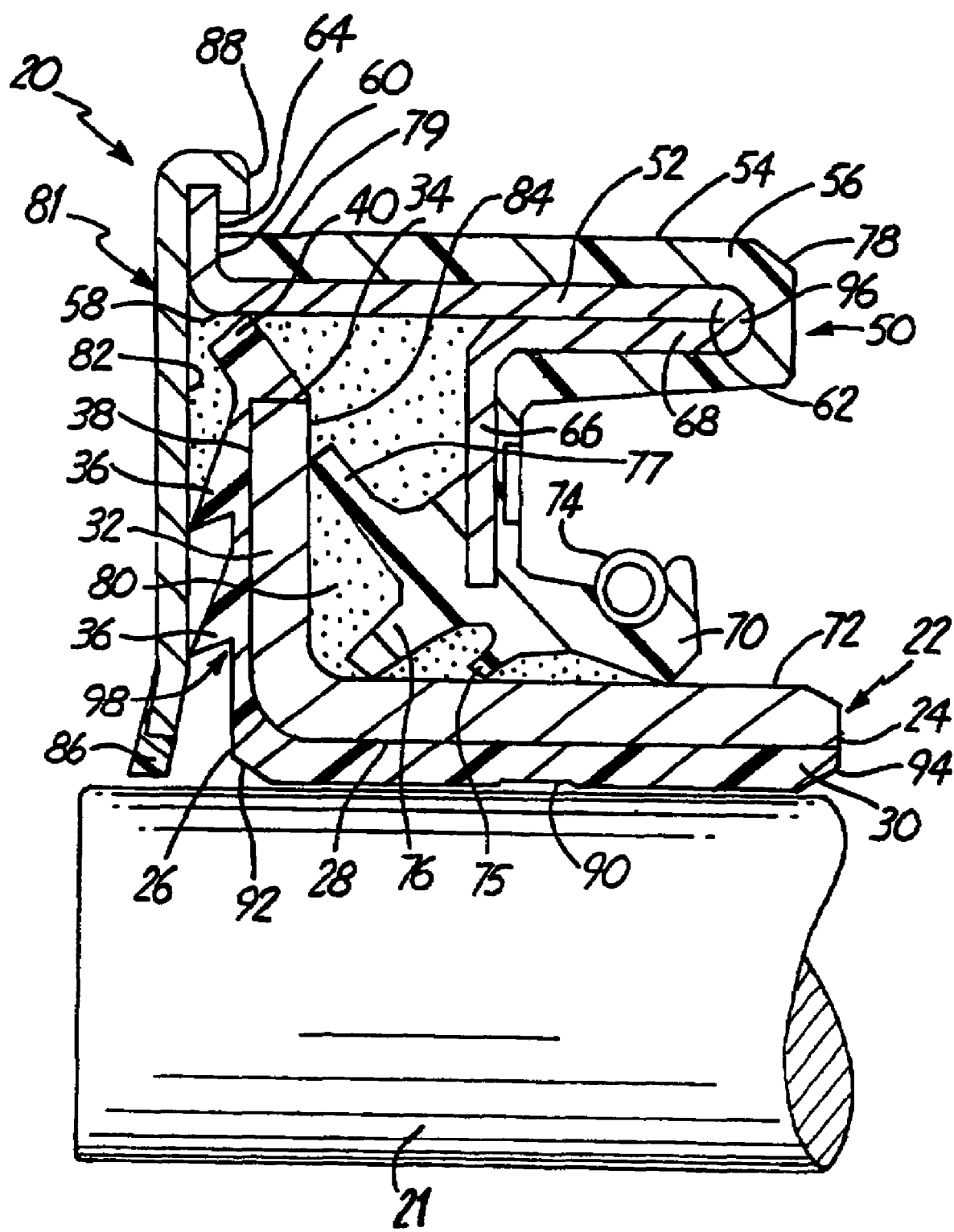
FIG. 1 shows a cross-sectional profile of an embodiment of a retrofittable severe duty seal for a shaft according to the present disclosure.

Referring now to the various figures of the accompanying drawing, FIG. 1 depicts a cross-sectional profile of an embodiment of the retrofittable severe duty seal 20 fitted onto a shaft 21. A cylindrical sleeve 22 component is disposed coaxially over, and in contact with, the shaft 21 so that when installation is complete, the sleeve 22 is affixed to the shaft 21. The sleeve inner end 24 extends into the sealed region, normally a housing or containment for oil or grease used to lubricate gears, bearings, or other moving parts.

To simplify nomenclature in this specification, the side or end or surface of a component that is oriented toward the lubricants, lubricated components, or other media from which it is desired to exclude dust, water, mud, and other environmental contaminants may be referred to using the terms "inner," "inward," "inside," and similar terms. The words "outer," "outward," "outside" and similar terms may be used to refer to a side, end, or surface of a component that is oriented away from the sealed region, toward the exterior of a housing, or toward the unsealed overall environment into which a shaft extends.

Between the sleeve inner end 24 and the sleeve outer end 26, the sleeve bore 28 may optionally be coated with an elastomeric coating 30. The optional sleeve bore elastomeric coating 30 is desirable because it may prevent leakage from between the seal 20 and the shaft 21 even when the shaft is worn, damaged, or otherwise imperfect.

The sleeve flange 32 extends radially outwardly from the sleeve outer end 26 and has a sleeve flange outer edge 34 at its outer periphery. At least one, and preferably two, face lips 36 extend coaxially outwardly from the sleeve flange 32 outer face 38 and a perimeter lip 40 extends radially outwardly from the sleeve flange outer edge 34. The sleeve bore elastomeric coating 30, the face lips 36, and the perimeter lip 40 may be integrally formed and bonded to the sleeve 22 in a single injection molding operation.

A seal case 50 is disposed coaxially outside the sleeve 22. The seal case 50 has a generally cylindrical case body 52 designed so that the case outside surface 54 can fit into and seal against a bore in a housing or flange through which the shaft 21 to be sealed extends. In one embodiment, the case outside surface 54 can be coated with a case elastomeric coating 56. The seal 20 is less likely to leak when installed in a damaged bore if the optional case elastomeric coating 56 is provided. The case body 52 has a case inner surface 58 that may be smoothly finished in the region near the case outer end 60 if the perimeter lip 40 will contact it.

The case inner end 62 is axially opposite the case outer end 60 and the case skirt 64 that extends radially outwardly from the case outer end 60.

A case inner flange 66 extends radially inwardly from the case body 52 toward the sleeve 22. The case inner flange 66 has a circular central aperture through which the shaft 21 and sleeve 22 fit. When the case inner flange 66 is drawn or otherwise made from the case body 52 it is possible to simultaneously form a case reinforcement 68 with a double layer of the material from which the case body 52 is made.

A main sealing lip 70 may attach to the case inner flange 66 and extend both axially inwardly and radially inward from the case inner flange 66. The main sealing lip 70 contacts the sleeve outer surface 72 to form the primary sealing element by which the contents of the sealed volume are prevented from transferring to the outside of the assembly. The main sealing lip 70 is optionally biased against the sleeve outer surface 72 by a garter spring 74. The sleeve outer surface 72 may be polished or otherwise finished to reduce wear of the main sealing lip 70. For higher pressure applications, the garter spring 74 can be a high pressure garter spring, and the sleeve 22 can be constructed of a hardened metal in order to create a seal that functions under high pressure.

Additional optional sealing elements are situated axially outwardly from the main sealing lip 70. These additional dust lips may extend between the case body 52, particularly the case inner flange 66, and the sleeve outer surface 72.

A mid-sleeve dust lip 75 may be located generally between the case inner flange 66 and the sleeve outer surface 72. A forward sleeve dust lip 76 may be disposed against the sleeve outer surface 72 at a location close to the sleeve flange 32. A case flange dust lip 77 may extend from the case inner flange 66 to contact the sleeve flange 32. The case elastomeric coating 56, the main sealing lip 70, the mid-sleeve dust lip 75, the forward sleeve dust lip 76 and the case flange dust lip 77 may be integrally formed and bonded to the case body 52 and case inner flange 66 in a single injection molding operation.

On the inner end of the case body 52, the case elastomeric coating 56 can be finished with a case elastomeric coating chamfer 78 to make it easier to install the seal 20 without distortion or damage. A case outside diameter relief channel 79 can be formed in the case elastomeric coating 56. The optional relief channel 79 relieves axial shear stresses from the case elastomeric coating 56 that may be induced by the process of installing the seal 20 into a bore.

In one embodiment, as shown in FIG. 1, three main sub-assemblies, the sleeve 22, the case 50, and the faceplate 81 can be interconnected to form a complete seal 20. These three sub-assemblies are normally made primarily of steel or other metal that is shaped, worked, and polished using conventional metalworking techniques and commercially available equipment. It may be advantageous to smooth the metal surfaces that are contacted by the various elastomeric components to obtain a metal finish having low surface roughness. Carefully shaped and molded elastomeric compounds may be bonded to the metal components in the configurations shown in the accompanying drawings. It is possible to form the elastomeric components and attach them to the metal structures in a variety of ways. In one embodiment, injection molding is used for these purposes.

Final assembly of the seal 20 is performed by carrying out four additional steps. First, water-resistant grease 80, such as Esso Beacon 325™ is packed to fill all of the voids between the lips and between the case inner flange 66 and the case skirt 64. Second, the sleeve 22 is inserted into the seal case 50 so that the sleeve flange dust lip 77 contacts the sleeve flange 32 and the perimeter lip 40 contacts the perimeter lip-contacting case inner surface 58. Third, grease 80 is packed into the interstices between the individual face lips 36 and also between the perimeter lip 40 and the outermost of the face lips 36. Fourth, the faceplate 81 is affixed to the case skirt 64 by crimping or other means to complete the assembly and unitizing process.

After the faceplate 81 is attached to the case skirt 64, the faceplate inner side 82 contacts the face lips 36 and the sleeve flange inner face 84 is brought into contact with the case flange dust lip 77.

An optional elastomeric faceplate wiper ring 86 can be bonded to a central aperture in the faceplate 81 coaxial with, and through which, the shaft 21 extends. The periphery of the faceplate 81 may be finished with a peripheral faceplate crimp edge 88 for crimping over the case skirt 64 when the faceplate 81 is attached by crimping.

A sleeve radial channel 90 is preferably formed within the sleeve bore elastomeric coating 30 to relieve shear as the seal 20 is fitted to a shaft. The sleeve 22 can be finished with a sleeve outer end chamfer 92 and a sleeve inner end chamfer 94 to reduce the potential for tearing of the sleeve bore elastomeric coating 30 and for distortion of the sleeve 22 during installation of the seal 20. Likewise, the seal case 50 may be fitted with a case inner end chamfer 96 to reduce damage to the case elastomeric coating 56 when the case is fitted with elastomeric coating and to prevent case distortion in embodiments without case elastomeric coating 56.

In one embodiment, the face lips 36 can be sharply angled radially inwardly with an acute point at the innermost portion of each of the face lips 36. In order to form a lip having such a shape, it may be necessary to include a face lip undercut angle 98 that is less than 90 degrees to obtain the desired performance characteristics. The face lips 36 may be formed having a generally triangular cross-section.

Figure 2:
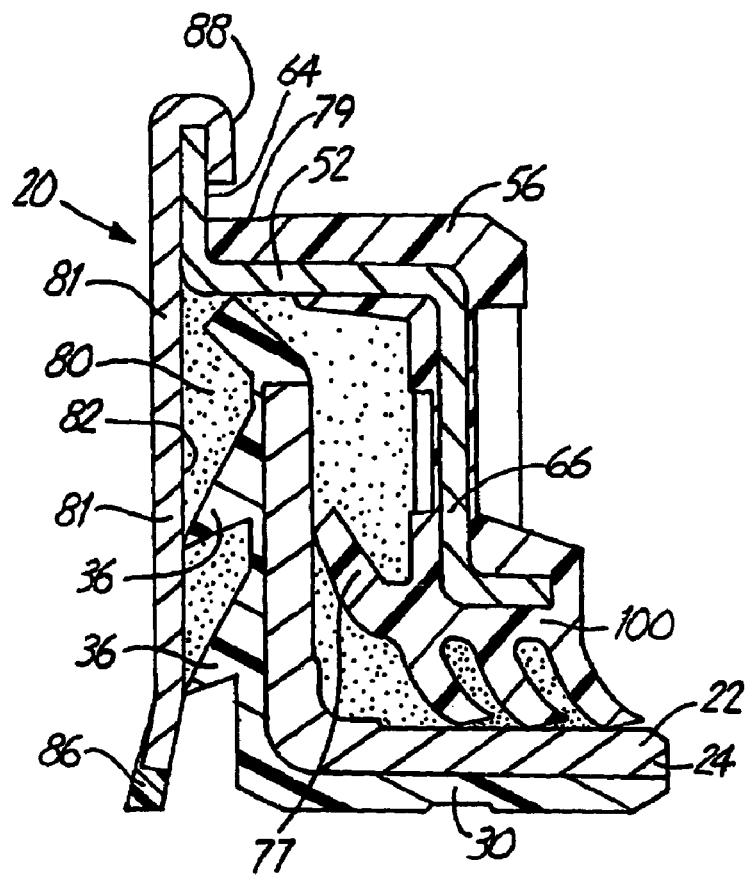
FIG. 2 shows a cross-sectional profile of another embodiment of the retrofittable severe duty seal for a shaft.

FIG. 2 shows an embodiment wherein the single main sealing lip 70 and garter spring 74 shown in FIG. 1 are replaced with a triple lip main seal 100. It may be desirable to also eliminate the mid-sleeve dust lip 75 and the forward sleeve dust lip 76 from embodiments having the main sealing lip 70 replaced by the triple lip main seal 100. This embodiment is especially useful for situations in which the space allowed for a seal in the assembly is less than approximately ¼", and where the lubricant contained in the sealed area is grease, such as in cultivator hub wheels.

Figure 3:
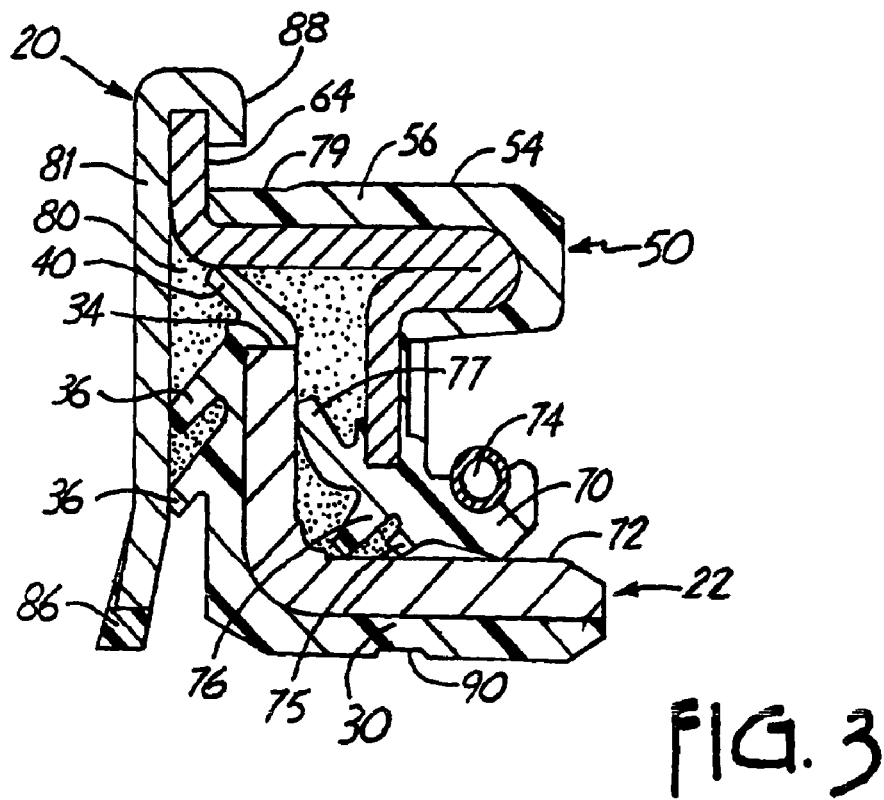
FIG. 3 shows a cross-sectional profile of another embodiment of the retrofittable severe duty seal for a shaft.

FIG. 3 shows an alternative embodiment of the seal 20 wherein the spacing relationship between the dust lips 75, 76, 77 is modified slightly from the relationship depicted in FIG. 1.

Figure 4:
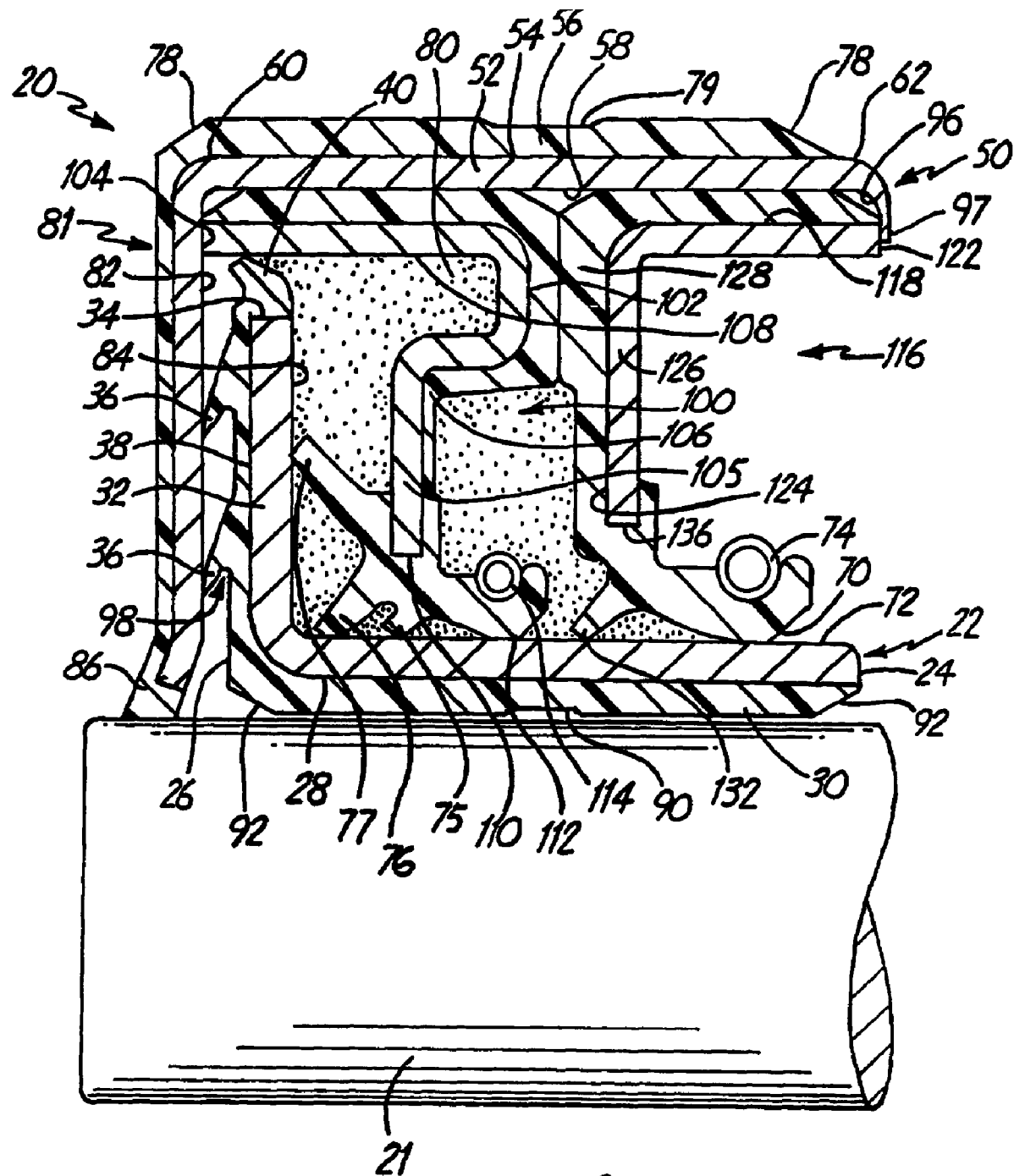
FIG. 4 shows a cross-sectional profile of another embodiment of the retrofittable severe duty seal for a shaft.

FIG. 4 depicts a cross-sectional profile embodiment of a flangeless retrofittable severe duty seal 20 fitted onto a shaft 21. The absence of a flange where the faceplate attaches to the casing allows the seal to fit into a bore space better than the seal embodiment shown in FIG. 1. Like the flanged embodiment, a cylindrical sleeve 22 component is disposed coaxially over, and in contact with, the shaft 21 so that when installation is complete, the sleeve 22 is affixed to the shaft 21. The sleeve inner end 24 extends into the sealed region, normally a housing or containment for oil or grease used to lubricate gears, bearings, or other moving parts.

Between the sleeve inner end 24 and the sleeve outer end 26, the sleeve bore 28 may optionally be coated with an elastomeric coating 30. The optional sleeve bore elastomeric coating 30 is desirable because it may prevent leakage from between the seal 20 and the shaft 21 even when the shaft is worn, damaged, or otherwise imperfect.

Like the embodiment shown in FIG. 1, a sleeve flange 32 extends radially outwardly from the sleeve outer end 26 and has a sleeve flange outer edge 34 at its outer periphery. At least one, and preferably two, face lips 36 extend coaxially outwardly from the sleeve flange 32 outer face 38 and a perimeter lip 40 extends outwardly from the sleeve flange outer edge 34. The sleeve bore elastomeric coating 30, the face lips 36, and the perimeter lip 40 may be integrally formed and bonded to the sleeve 22 in a single injection molding operation.

A seal case 50 is disposed coaxially outside the sleeve 22. The seal case 50 has a generally cylindrical case body 52 designed so that the case outside surface 54 can fit into and seal against a bore in a housing or flange through which the shaft 21 to be sealed extends. In one embodiment, the case outside surface 54 can be coated with a case elastomeric coating 56. The seal 20 is less likely to leak when installed in a damaged bore if the optional case elastomeric coating 56 is provided. The case body 52 has a case inner surface 58 that may be smoothly finished in the region near the case outer end 60 if the perimeter lip 40 will contact it.

The case inner end 62 is axially opposite the case outer end 60. An insert 100 (if there is more than one insert, a "first" or "medial" insert 100) may be introduced within the case 50 through the case inner end 62. The medial insert 100 as shown in FIG. 4, has an outer surface, an insert inner end 102 and an outer end 104 that are securely disposed against the case inner surface 58 and the case outer end 60.

Figure 5:
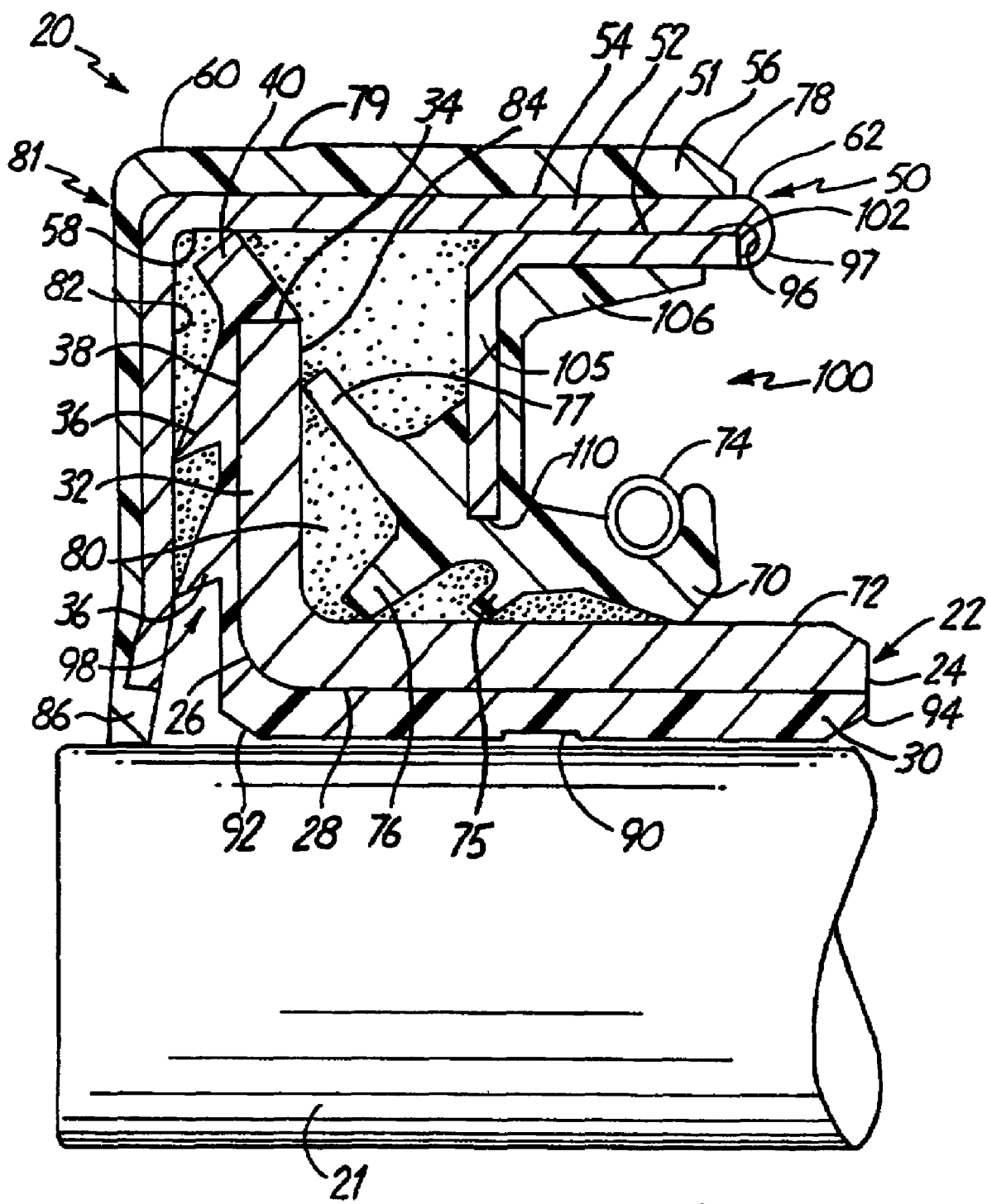
FIG. 5 shows a cross-sectional profile of another embodiment of the retrofittable severe duty seal for a shaft.

A first insert flange 105 extends radially inwardly from the case body 52 toward the sleeve 22. The first insert flange 105 has a circular central aperture through which the shaft 21 and sleeve 22 fit. Positioning the insert 100 within the case body 52 reinforces the structure with a double layer of the material from which the case body 52 is made. In addition, the insert flange 105 stiffens the case body 52. Alternatively, as is shown in FIG. 5, the flange 105 can be drawn or otherwise made from the case body 52, making it possible to simultaneously form a case reinforcement with a double layer of material from which the case body 52 is made.

It may be desirable to coat the case contacting insert 100 surface 102 with an elastomer coating 106 opposite the first insert inside cylindrical surface 108. The elastomer coating 106 may extend to the insert flange bore 110 and may also be used to integrally form the seal lip 112 and excluder lips.

The secondary sealing lip 112 (in configurations having multiple inserts, otherwise it is the primary sealing lip) attaches to the case medial, or first, insert flange 105 and extends both axially inwardly and radially inward from the first insert flange 105. The sealing lip 112 may be biased radially inwardly by a garter spring 114.

An optional second, or oil side, cylindrical insert 116 may also be fitted within the case body 52. An oil side insert outer surface 118 can be disposed against the case body inner surface 58 with the second insert inner end 122 proximate the case inner end 62 and the second insert outer end 124 adjacent the first insert inner end 102. An oil side flange 126 extends radially inwardly toward the sleeve 22 and has affixed to it the elastomer coating 128 that also coats the oil side flange bore 130. One or more oil side excluder lips 132 and the primary seal 70 may be formed integrally from the elastomeric coating 128 applied to the insert 116.

The primary seal lip 70 contacts the sleeve outer surface 72 to form the sealing element by which the contents (generally fluids) of the sealed volume are prevented from transferring to the outside of the assembly. A biasing spring 74 may urge the main seal lip 70 against the sleeve outer surface 72.

Likewise, the secondary sealing lip 112 is optionally biased against the sleeve outer surface 72 by a garter spring 114. The sleeve outer surface 72 may be polished or otherwise finished to retard wear of the elastomeric elements. Additional contaminant excluding elements are situated axially outwardly from either or both the primary seal lip 70 and or the secondary sealing lip 112. These additional dust lips (also called excluder lips) may extend between the case body 52 or from the inserts 100, 116 disposed within the case body 52 and brought into contact with the sleeve outer surface 72 or the inner side of the sleeve flange 32.

A mid-sleeve dust lip 75 may be located generally between the first insert flange 105 and the sleeve outer surface 72. A forward sleeve dust lip 76 may be disposed against the sleeve outer surface 72 at a location close to the sleeve flange 32. A sleeve flange dust lip 77 may extend from the first insert flange 105 to contact the sleeve flange 32. The case elastomeric coating 56, the main sealing lip 70, the mid-sleeve dust lip 75, the forward sleeve dust lip 76 and the sleeve flange dust lip 77 may be integrally formed and bonded to the first insert 100 in a single injection molding operation.

On the inner end of the case body 52, the case elastomeric coating 56 is finished with a case elastomeric coating chamfer 78 to make it easier to install the seal 20 without distortion or damage. A case outside diameter relief channel 79 is formed in the case elastomeric coating 56. The optional relief channel 79 relieves axial shear stresses from the case elastomeric coating 46 that may be induced by the process of installing the seal 20 into a bore. Application of grease 80 to the shaft 21 or bore during installation is generally not recommended.

Three main sub-assemblies, the sleeve 22, the case 50, and the faceplate 81 are interconnected to form a complete seal 20. These three sub-assemblies are normally made primarily of steel or another metal that is shaped, worked, and polished using conventional metalworking techniques and commercially available equipment. It may be advantageous to smooth the metal surfaces that are contacted by the various elastomeric components to obtain a metal finish having low surface roughness. Carefully shaped and molded elastomeric compounds are bonded to the metal components in the configurations shown in the accompanying drawing. It is possible to form the elastomeric components and attach them to the metal structures in a variety of ways, such as injection molding.

Final assembly of the seal 20 is performed by carrying out four additional steps. First, water-resistant grease 80, such as Esso Beacon 325™ is packed to fill all of the voids between the lips and between the inserts 110, 116. Second, the sleeve 22 is inserted into the seal case 50 so that the sleeve flange dust lip 77 contacts the sleeve flange 32 and the perimeter lip 40 contacts the perimeter lip-contacting case inner surface 58 or an equivalent cylindrical inner surface. Third, grease 80 is packed into the interstices between the individual face lips 36 and also between the perimeter lip 40 and the outermost of the face lips 36. Fourth, the inserts 100, 116 are secured within the seal case 42 by crimping or other means to complete the assembly and unitizing process.

After the sleeve 22 is fitted within the seal case 50, the faceplate inner side 82 contacts the face lips 36 and the sleeve flange inner face 84 is brought into contact with the sleeve flange dust lip 77.

An optional elastomeric faceplate wiper ring 86 can be bonded to a central aperture in the faceplate 81 coaxial with, and through which, the shaft 21 extends.

A sleeve radial channel 90 is preferably formed within the sleeve bore elastomeric coating 30 to relieve shear as the sleeve 20 is fitted to a shaft. The sleeve is finished with a sleeve outer end chamfer 92 and a sleeve inner end chamfer 94 to reduce the potential for tearing of the sleeve bore elastomeric coating 30 and for distortion of the sleeve 22 during installation of the seal 20. Likewise, the seal case 50 may be fitted with a case inner end chamfer 96 to reduce damage to the case elastomeric coating 56 when the case is fitted with elastomeric coating and to prevent case distortion in embodiments without case elastomeric coating 56. A case crimp 97 is used to prevent the inserts 100, 116 from becoming dislodged during installation and operation.

It is believed preferable for the face lips 36 to be sharply angled radially inwardly with an acute point at the innermost portion of each of the face lips 36. In order to form a lip having such a shape, it may be necessary to include a face lip undercut angle 98 that is less than 90 degrees to obtain the desired performance characteristics. The face lips 36 may be formed having a generally triangular cross-section.

FIG. 5 shows an embodiment wherein the seal 20 is fitted with a single insert 100 and sealing lip 70. Although there may be some loss of ruggedness in this configuration, the countervailing considerations are that the seal can have a narrower profile, lower cost, lighter weight, lower rolling resistance, and still has excellent performance and durability.

Figure 6:
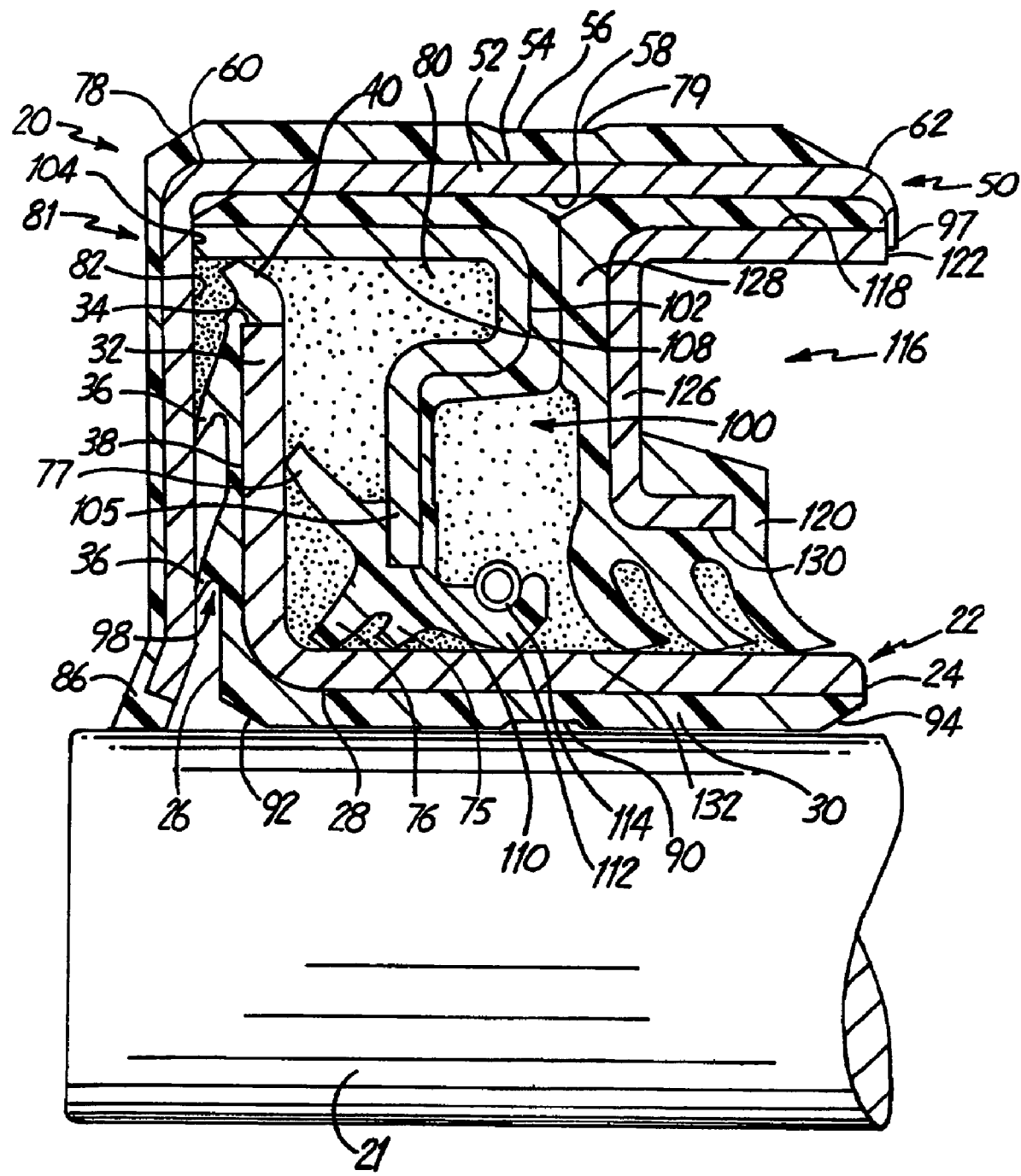
FIG. 6 shows a cross-sectional profile of another embodiment of the retrofittable severe duty seal for a shaft.

FIG. 6 shows an alternative embodiment of the seal 20 wherein a triple lip main seal 120 is used in place of the single lip primary seal 70 with garter spring 74. Otherwise, the configuration is similar to that depicted in FIG. 4. The triple lip seal 120 may allow a narrower profile, but will often require a seal configuration that has more radial space (i.e. increased height).

Figure 7:
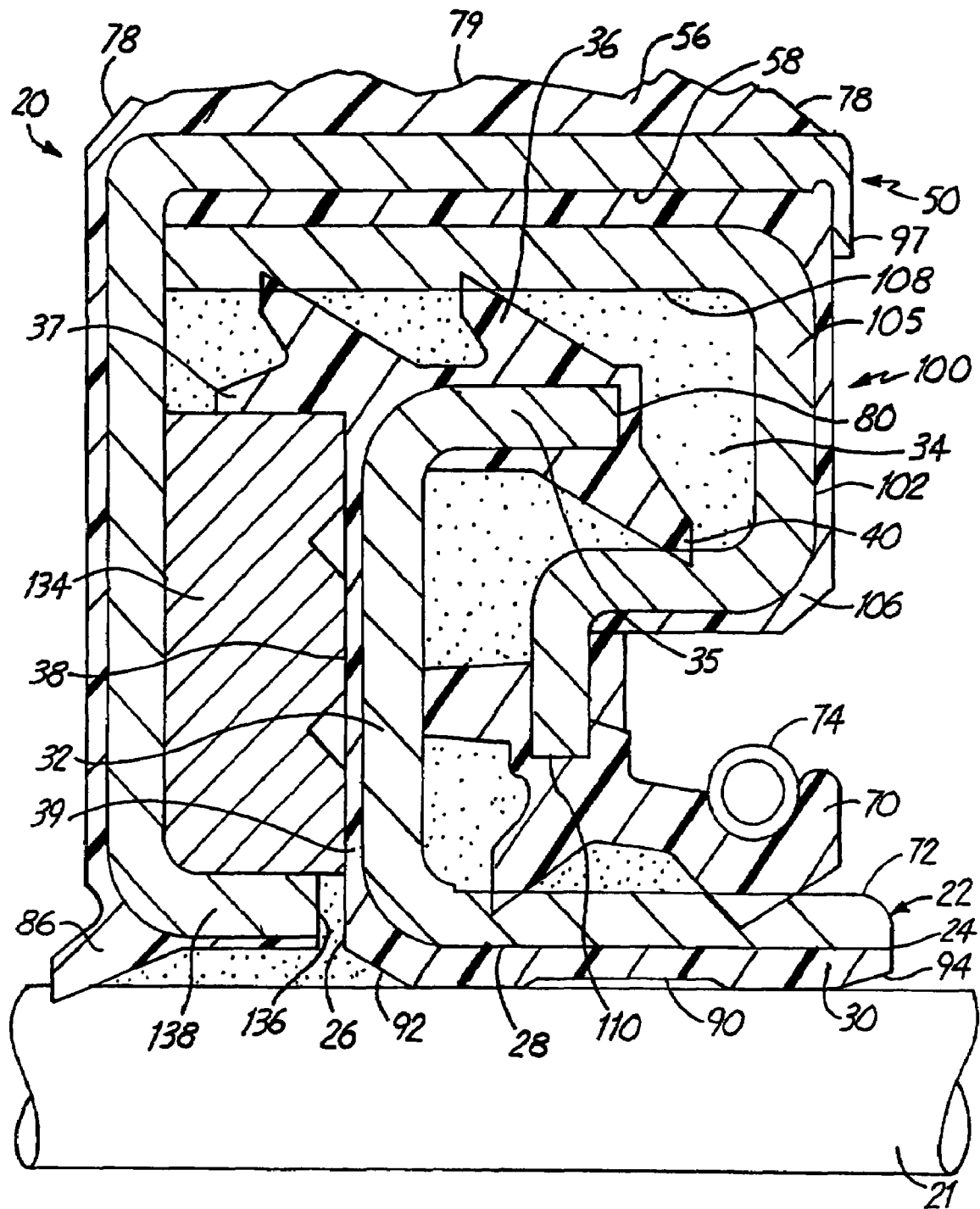
FIG. 7 shows a cross-sectional profile of another embodiment of the retrofittable severe duty seal for a shaft.

FIG. 7 shows another embodiment of the invention having a flexible filtering material 134 located between the faceplate 81 and the outside face 38 of the sleeve flange 32. In one embodiment, the flexible filtering material 134 is a piece of wool felt. In another embodiment, the flexible filtering material is a synthetic filtering material. The filtering material 134 is suspended between the outside face 38 of the sleeve flange 32, and the inside face of the faceplate. The flexible filtering material 134 may rotate with the sleeve flange 32, or may remain stationary with the faceplate 81. In an embodiment employing the flexible filtering material 134, the end of the sleeve flange 34 may extend towards the sealed region to be approximately parallel with the sleeve 22, forming a flange 35, so that the face lips 36 and the perimeter lip 40 may contact the inner face 108 of an insert 105.

A retaining lip 37 may be formed adjacent to the face lips 36, to help to hold the filtering material 134 in place. In one embodiment, the retaining lip 37 is made at least in part with an elastomeric material. Also in this embodiment, the end of the faceplate 136 may extend towards the sealed region to form a flange 138 that can help to hold the filtering material 134 in place.

The seal shown in FIG. 7 can be modified to employ other characteristics described for the other embodiments of the present invention. For instance, the seal of FIG. 7 could employ a case skirt, such as that shown in FIGS. 1-3, and the faceplate 81, as a separate piece from the case 56, can be crimped to the case skirt to form a connection. The main sealing lip 70 can also be replaced by a triple lip seal, as shown in FIGS. 2 and 6. The seal can also employ a second insert and a secondary sealing lip as shown in FIG. 4.

Figure 8:
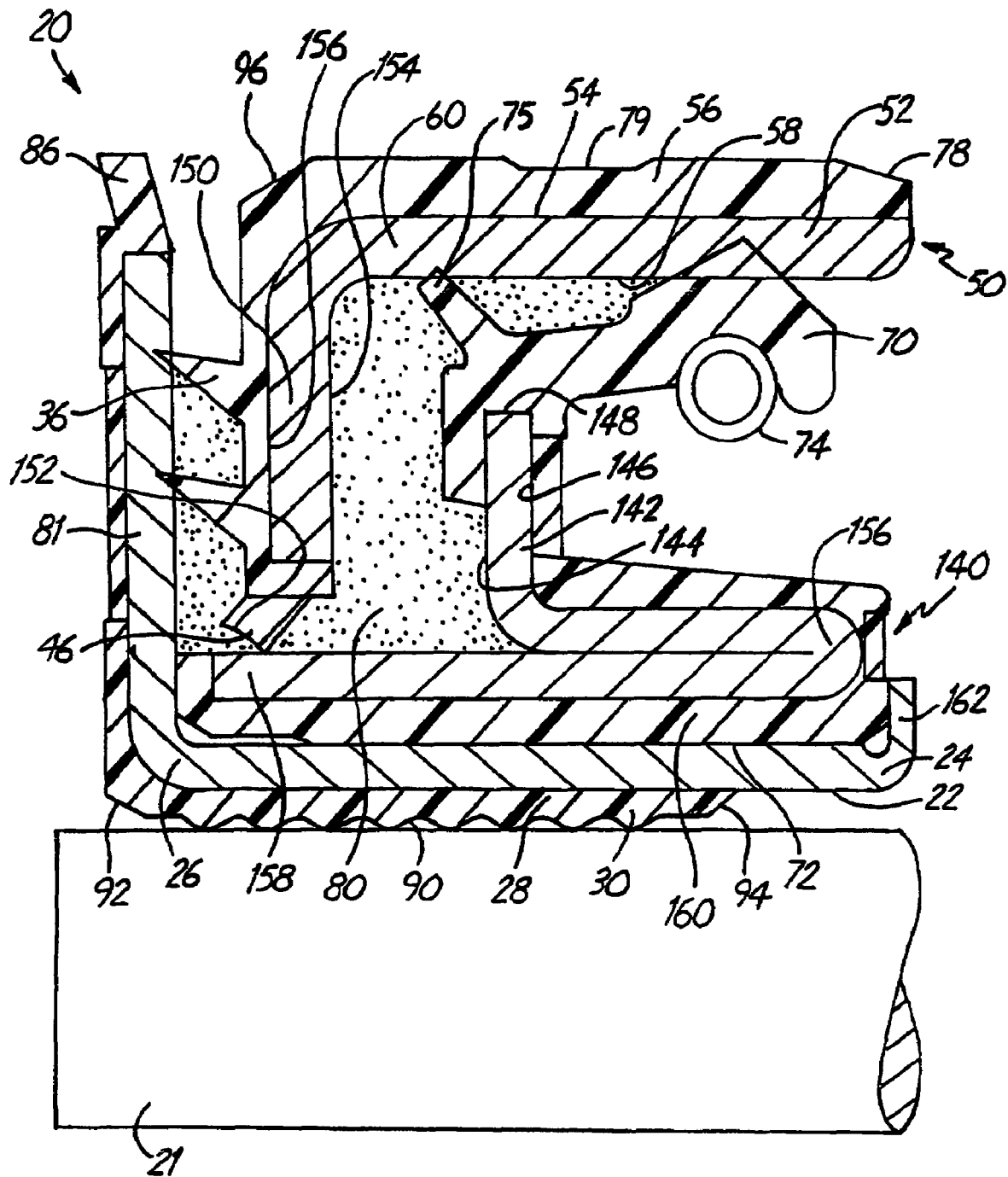
FIG. 8 shows a cross-sectional profile of another embodiment of the retrofittable severe duty seal for a shaft.

FIG. 8 shows another embodiment of the seal of the present invention. The seal shown in FIG. 8 is an inverted example of the seals depicted in FIGS. 4-7. The seal of FIG. 8 is useful for applications having a stationary shaft and a rotating bore section, such as in a tread driven vehicle.

A cylindrical sleeve 22 component is disposed coaxially over, and in contact with, the shaft 21 so that when installation is complete, the sleeve 22 is affixed to the shaft 21. The sleeve inner end 24 extends into the sealed region, normally a housing or containment for oil or grease used to lubricate gears, bearings, or other moving parts.

Between the sleeve inner end 24 and the sleeve outer end 26, the sleeve bore 28 may optionally be coated with an elastomeric coating 30. The optional sleeve bore elastomeric coating 30 is desirable because it may prevent leakage from between the seal 20 and the shaft 21 even when the shaft is worn, damaged, or otherwise imperfect.

A seal case 50 is disposed coaxially outside the sleeve 22. The seal case 50 has a generally cylindrical case body 52 designed so that the case outside surface 54 can fit into and seal against a bore in a housing or flange through which the shaft 21 to be sealed extends. In one embodiment, the case outside surface 54 can be coated with a case elastomeric coating 56. The seal 20 is less likely to leak when installed in a damaged bore if the optional case elastomeric coating 56 is provided. The case body 52 has a case inner surface 58 that may be smoothly finished if the main sealing lip 70 and dustlip 75 are to be in contact with the inner surface 58.

A case flange 150 extends radially inwardly from the case outer end 60 and has a case flange outer edge 152 at its outer periphery. The case flange 150 has a circular central aperture through which the shaft 21 and sleeve 22 fit. At least one, and preferably two, face lips 36 extend coaxially outwardly from the case flange 150 outer face 154 and a perimeter lip 40 extends radially inwardly from the sleeve flange outer edge 152. The case outside surface elastomeric coating 30, the face lips 36, and the perimeter lip 40 may be integrally formed and bonded to the case 50 in a single injection molding operation.

The sleeve inner end 24 is axially opposite the sleeve outer end 26. An insert 140 (if there is more than one insert, a "first" or "medial" insert 140) may be introduced within the sleeve 22 through the sleeve inner end 24. The medial insert 140 as shown in FIG. 8, has an outer surface, an insert inner end 156 and an outer end 158 that are securely disposed against the sleeve outer surface 72 and the sleeve outer end 26.

A first insert flange 142 extends radially outwardly from the sleeve body 22 toward the case 50. Positioning the insert 140 within the sleeve body 22 reinforces the structure with a double layer of the material from which the sleeve body 22 is made. In addition, the insert flange 142 stiffens the sleeve body 22. Alternatively, the flange 142 can be drawn or otherwise made from the sleeve body 22, making it possible to simultaneously form a sleeve reinforcement with a double layer of material from which the sleeve body 22 is made.

It may be desirable to coat the sleeve contacting insert 146 surface with an elastomer coating 160 opposite the first insert inside insert surface 144. The elastomer coating 160 may extend outward from the end of the insert flange 148 and may also be used to integrally form the seal lip 70 and excluder lip 132.

The seal shown in FIG. 8 can optionally have a secondary sealing lip (in configurations having multiple inserts, such as numeral 112 in FIG. 4, otherwise it is the primary sealing lip), which attaches to the sleeve medial, or first, insert flange 140 and can extend both axially inwardly and radially outward from the first insert flange 140. The sealing lip may be biased radially outwardly by a garter spring 74.

An optional second, or oil side, cylindrical insert (such as numeral 116 in FIG. 4) may also be fitted within the seal body 22. All of the features of the second insert as described in FIG. 4 may apply to the seal of FIG. 8, except that it would be inverted. For instance, the insert would be attached to the sleeve 22 instead of the case, and the lips and flanges would extend radially outward from the sleeve.

The primary seal lip 70 contacts the case inner surface 58 to form the sealing element by which the contents (generally fluids) of the sealed volume are prevented from transferring to the outside of the assembly. A biasing spring 74 may urge the main seal lip 70 against the case inner surface 58.

Likewise, an optional secondary sealing lip (not shown) is optionally biased against the case inner surface 58 by a garter spring. The case inner surface 58 may be polished or otherwise finished to retard wear of the elastomeric elements. Additional contaminant excluding elements are situated axially outwardly from either or both the primary seal lip 70 and or the optional secondary sealing lip. These additional dust lips (also called excluder lips) may extend from the sleeve body 22, or from the insert 140 disposed within the sleeve body 22 and brought into contact with the case inner surface 58 or the inner side of the case flange 154.

A mid-sleeve dust lip 75 may be located generally between the first insert flange 142 and the case inner surface 58. Other optional lips, such as a forward sleeve dust lip may be disposed against the sleeve outer surface at a location close to the case flange 150. A case flange dust lip may also extend from the first insert flange 142 to contact the case flange 150. The case elastomeric coating 56, the main sealing lip 70, the mid-sleeve dust lip 75, and other optional lips, such as the forward sleeve dust lip and the sleeve flange dust lip, may be integrally formed and bonded to the first insert 140 in a single injection molding operation.

On the inner end of the case body 52, the case elastomeric coating 56 is finished with a case elastomeric coating chamfer 78 to make it easier to install the seal 20 without distortion or damage. A case outside diameter relief channel 79 is formed in the case elastomeric coating 56. The optional relief channel 79 relieves axial shear stresses from the case elastomeric coating 46 that may be induced by the process of installing the seal 20 into a bore. Application of grease 80 to the shaft 21 or bore during installation is generally not recommended. A sleeve crimp 162 is used to prevent the insert 140 from becoming dislodged during installation and operation.

A sleeve radial channel 90 is preferably formed within the sleeve bore elastomeric coating 30 to relieve shear as the sleeve 20 is fitted to a shaft. The sleeve is finished with a sleeve outer end chamfer 92 and a sleeve inner end chamfer 94 to reduce the potential for tearing of the sleeve bore elastomeric coating 30 and for distortion of the sleeve 22 during installation of the seal 20. Likewise, the seal case 50 may be fitted with a case inner end chamfer 96 to reduce damage to the case elastomeric coating 56 when the case is fitted with elastomeric coating and to prevent case distortion in embodiments without case elastomeric coating 56.

The seal also has a faceplate 81 similar to the seals in FIGS. 1-7, where the faceplate inner face 82 contacts the excluder lips 36. In a seal having a stationary shaft and a rotating bore, the faceplate is operably coupled to the sleeve 22. The end of the faceplate 85 can have a wiper ring 86 attached to it. In one embodiment, the wiper ring is constructed at least in part with an elastomeric material.

Figure 9:
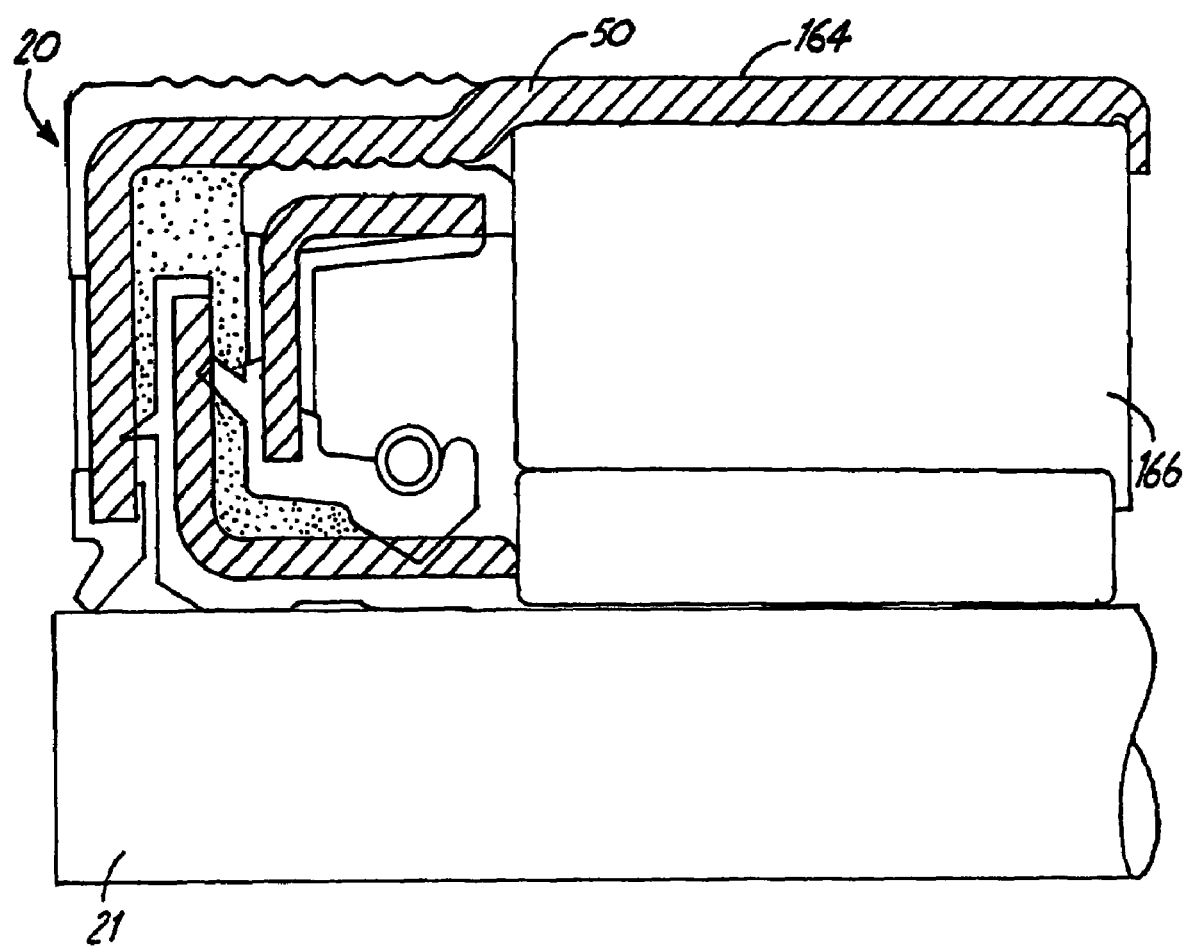
FIG. 9 shows a cross-sectional profile of another embodiment of the retrofittable severe duty seal for a shaft.

FIG. 9 shows an embodiment of the invention, wherein the seal case 50 extends inward to form a sleeve 164 that can be used as a housing for a bearing 166 or a bearing holder (not shown). The seal 20 can be any seal designed to fit onto a rotating shaft, such as the seals depicted in FIGS. 1-7. Once a bearing 166 is inserted into the housing 164, the entire unit can be inserted into a bore.

Figure 10:
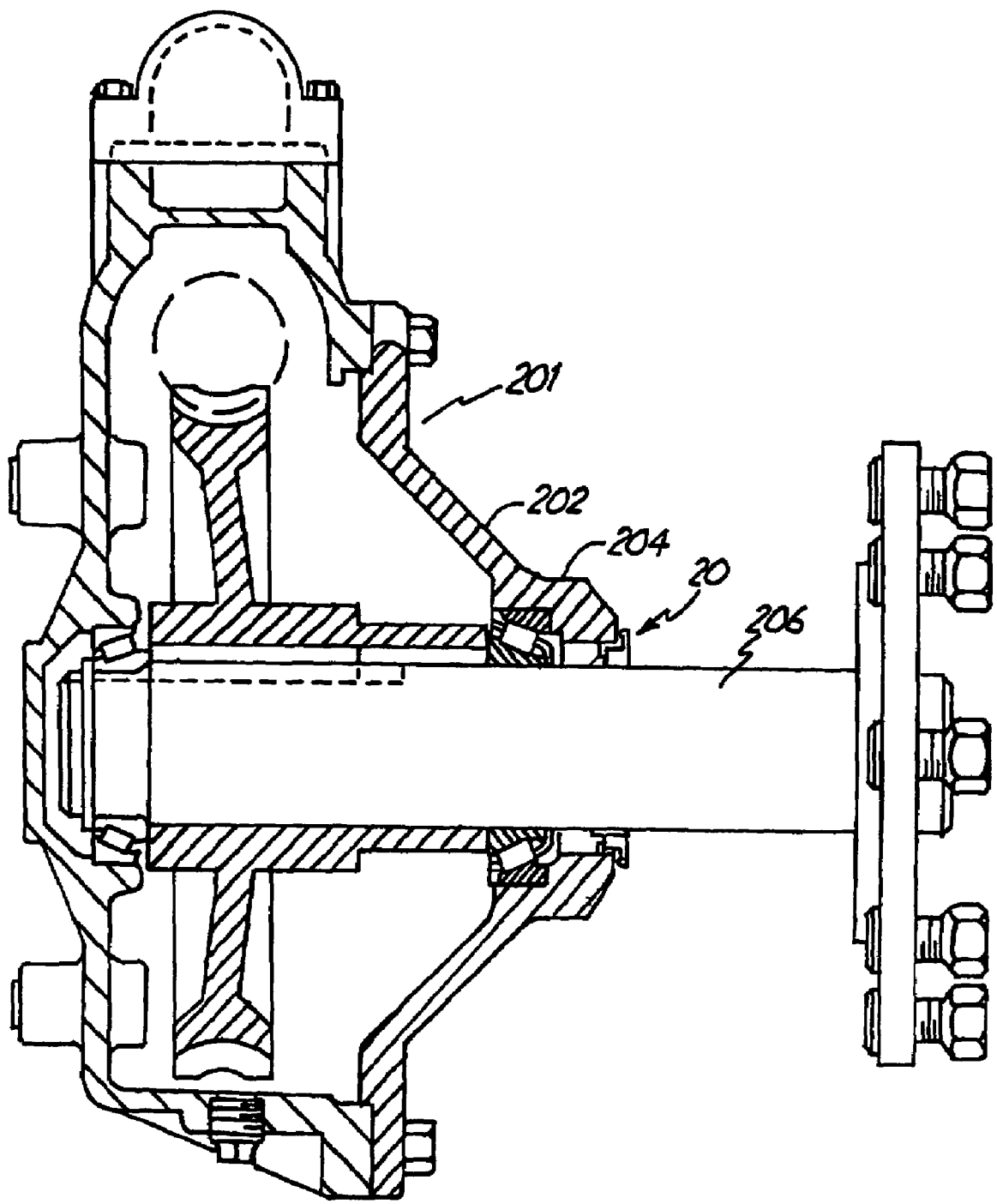
FIG. 10 shows a representative assembly of a type that is adapted for receiving the retrofittable seal of FIGS. 1-3.

FIG. 10 shows a representative application in which the seal 20 may be installed, specifically, a worm gear drive assembly 201. The seal 20 is fitted into the bore of a housing 202 to seal a bearing 204 from outside contaminants and to prevent lubricants from leaking out of the housing 202 around the output shaft 206 of the worm gear drive assembly 201. The seal 20 depicted in FIG. 10 is a flanged seal, such as those depicted in FIGS. 1-3. However, any of the seals and combinations of elements of the seals depicted in any of the FIGS. 1-7 may be used in this application.

Figure 11:
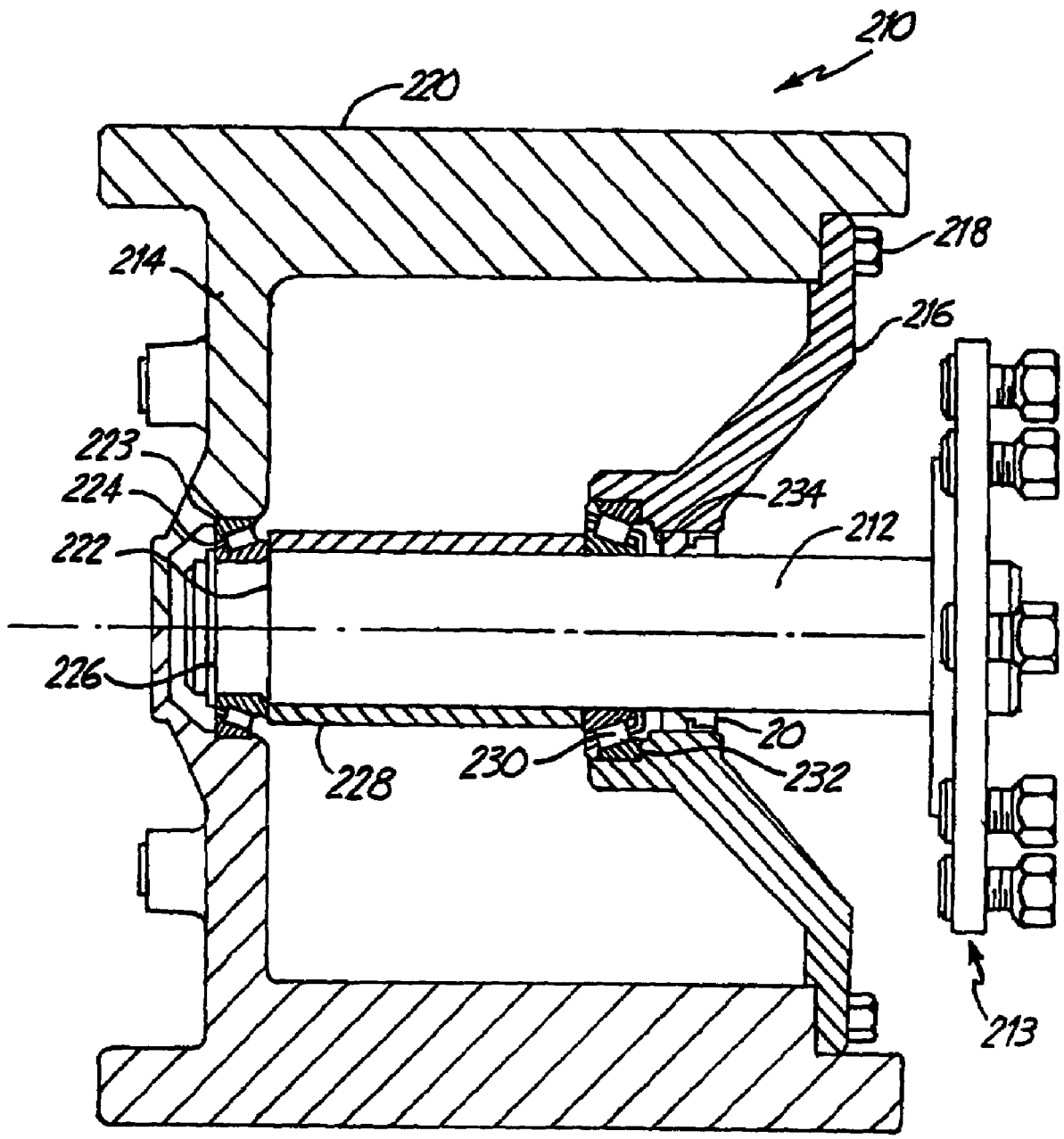
FIG. 11 shows a representative assembly of a type that is adapted for receiving the retrofittable seal of FIGS. 4-7 and 8.

FIG. 11 shows a representative application in which the seal 20 may be installed, specifically, a roller assembly 210. The seal 20 in FIG. 11 can be any of the seals depicted in the above figures. In FIG. 11, the seal is a flanged seal, such as those depicted in FIGS. 1-3. The roller 210 is retained on a stub shaft 212 secured with any known stub fastener assembly 213, for example screw fasteners that retain a plate. The roller 210 may be comprised of an end cap 214, opposite a seal cover 216 held in place by cover fasteners 218 such as cap screws that engage, either directly or indirectly, a roller load-contacting peripheral surface 220 situated between the end cap 214 and the seal cover 216. By way of illustration only, and not by way of limitation, a stub shaft 212 may have a shoulder 222 and the end cap 214 may have a shoulder 223 also between which against which a distal roller bearing 224 may fit when affixed to the shaft 212. Adjacent the roller bearing 224 and opposite the shaft shoulder 222, a retainer 226 may be installed on the shaft 212 to prevent the roller 210 from detaching.

A coaxial spacer 228 can be fitted between the distal roller bearing 224 and a medial roller bearing 230. A cover shoulder 232 urges the medical roller bearing 230 against the spacer 228. The seal 20 is fitted into the cover bore 234 to prevent loss of lubricant and to exclude contaminants from the bearings 224 230.

From the foregoing, it may be readily understood by those skilled in the art that the embodiments disclosed are applicable to industry and mechanical power transmissions generally, and to machinery and vehicles that are operated in severe environments, particularly. Incorporation of the present embodiment into new and existing equipment is expected to substantially reduce the maintenance requirements of many types of construction and agricultural equipment.

To use the seals as described, a dynamic shaft assembly is provided, wherein a housing containing the assembly has a bore through which the assembly extends. A seal 20 as described above is coaxially fitted onto the shaft, and is designed so that the case body 52 can fit into and seal against the bore, thus sealing the bearing, and preventing lubricants from escaping the assembly, and foreign materials from entering.

Changes and modifications in the specifically described embodiments can be carried out without departing from the scope of the invention which is intended to be limited only by the scope of the claims.

With regard to means for fastening, mounting, attaching or connecting the components of the present invention to form the seal as a whole, unless specifically described otherwise, such means are intended to encompass conventional fasteners such as nut and bolt-type connectors, threaded connectors, snap members, clamps and the like, rivets, toggles, pins and the like. Components may also be connected by welding, friction fitting or deformation, if appropriate. Electrical connections, if any, for use in or during the process, may be made using appropriate electrical components and connection methods, including conventional components and connectors. Suitable computers, microprocessors and the like may be used in the method. Unless specifically otherwise disclosed or taught, materials for making components of the present invention are selected from appropriate materials such as metal, metallic alloys, fibers, plastics and the like, and appropriate manufacturing or production methods including casting, extruding, molding and machining may be used.

Any references to front and back, right and left, top and bottom and upper and lower are intended for convenience of description, not to limit the present invention or its components to any one positional or spacial orientation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seal for sealing a dynamic shaft assembly, comprising:
    a sleeve adapted to be disposed generally coaxially around a shaft;
    a casing adapted to be generally arranged to surround the sleeve;
    a faceplate, located between the sleeve and the casing, having an inside face and an outside face, the faceplate generally perpendicular to the sleeve;
    at least one flexible member operably coupled to the casing, and contacting the inside face of the faceplate;
    a first flange extending radially inwardly from and being generally perpendicular to the casing;
    a perimeter lip extending radially inwardly from the first flange, wherein the at least one flexible member and the perimeter lip are constructed at least in part with an elastomeric material; and
    a second flange extending radially outwardly from and being generally perpendicular to the sleeve and including an elastomeric sealing lip extending radially outwardly therefrom and in sealing engagement with the casing, wherein the first flange is located axially between the faceplate and the second flange.

2. The seal of claim 1, further comprising a main sealing lip in contact with the casing.

3. The seal of claim 2, wherein the main sealing lip is constructed at least in part with an elastomeric material.

4. The seal of claim 2, wherein the main sealing lip is biased.

5. The seal of claim 4, wherein the main sealing lip is biased with a garter spring.

6. The seal of claim 1, further comprising at least one excluder lip in contact with the casing.

7. The seal of claim 6, wherein the at least one excluder lip is constructed at least in part with an elastomeric material.

8. The seal of claim 1, wherein the faceplate is generally planar.

9. The seal of claim 8, wherein the faceplate has a central aperture larger than the diameter of the shaft.

10. The seal of claim 8, wherein the faceplate is made primarily of metal and has a wiper ring extending radially outwardly from one end of the faceplate.

11. The seal of claim 10, wherein the wiper ring is made at least in part with an elastomeric material.

12. The seal of claim 1, wherein the at least one flexible member has a triangular cross section.

13. The seal of claim 1, wherein an inside diameter area of the sleeve is coated at least in part with an elastomeric material.

14. The seal of claim 13, wherein the coating of the inside diameter area of the sleeve has a radial channel formed generally medial two ends of the sleeve.

15. The seal of claim 13, wherein the inner end of the coating is chamfered.

16. The seal of claim 1, wherein an outside diameter area of the casing is coated at least in part with an elastomeric material.

17. The seal of claim 16, wherein a casing outside diameter relief channel is formed in the coating proximate an outer end of the casing.

18. The seal of claim 16, wherein an end of the coating is chamfered.

19. The seal of claim 1, further comprising a water-resistant material that fills in all of the open space between the sleeve and casing.

20. The seal of claim 19, wherein the water-resistant material is grease.

21. The seal of claim 1, wherein the flexible member is coupled to the first flange.

22. The seal of claim 1, wherein the casing includes a cylindrical case body having the first flange extending radially inward from an end thereof.

23. A seal for sealing a dynamic shaft assembly, comprising:
    a sleeve adapted to be disposed generally coaxially around a shaft;
    a casing adapted to be generally arranged to surround the sleeve;
    a faceplate, located between the sleeve and the casing, having an inside face and an outside face, the faceplate generally perpendicular to the sleeve;
    a first flange extending radially inwardly from and being generally perpendicular to the casing;
    at least one flexible member operably coupled to the first flange, and contacting the inside face of the faceplate;
    a perimeter lip extending radially inwardly from the first flange, wherein the at least one flexible member and the perimeter lip are constructed at least in part with an elastomeric material; and
    a second flange extending radially outwardly from and being generally perpendicular to the sleeve and including an elastomeric sealing lip extending radially outwardly therefrom and in sealing engagement with the casing.

24. The seal of claim 23, wherein the first flange is located axially between the faceplate and the second flange.

25. The seal of claim 23, wherein the casing includes a cylindrical case body having the first flange extending radially inward from an end thereof.

26. A seal for sealing a dynamic shaft assembly, comprising:
    a sleeve adapted to be disposed generally coaxially around a shaft;
    a casing adapted to be generally arranged to surround the sleeve and including a cylindrical case body having a first flange extending radially inwardly from an end thereof generally perpendicular to the case body;
    a faceplate, located between the sleeve and the casing, having an inside face and an outside face, the faceplate generally perpendicular to the sleeve;
    at least one flexible member operably coupled to the casing and rotationally fixed relative thereto, and contacting the inside face of the faceplate;
    a perimeter lip extending radially inwardly from the first flange, wherein the at least one flexible member and the perimeter lip are constructed at least in part with an elastomeric material; and
    a second flange extending radially outwardly from and being generally perpendicular to the sleeve and including an elastomeric sealing lip extending radially outwardly therefrom and in sealing engagement with the casing.

27. The seal of claim 26, wherein the first flange is located axially between the faceplate and the second flange.

28. The seal of claim 26, wherein the flexible member is coupled to the first flange.

* * * * *